(12) United States Patent
Koslar

(10) Patent No.: US 6,404,338 B1
(45) Date of Patent: Jun. 11, 2002

(54) MEASURING AND/OR SECURITY SYSTEM

(75) Inventor: Manfred Koslar, Berlin (DE)

(73) Assignee: Nanotron Gesellschaft fur Mikrootechnik mbH, Berlin (DE)

( * ) Notice: Subject to any disclaimer, the term of this patent is extended or adjusted under 35 U.S.C. 154(b) by 0 days.

(21) Appl. No.: 09/297,154

(22) PCT Filed: Nov. 3, 1997

(86) PCT No.: PCT/DE97/02605

§ 371 (c)(1),
(2), (4) Date: Apr. 26, 1999

(87) PCT Pub. No.: WO98/20362

PCT Pub. Date: May 14, 1998

(30) Foreign Application Priority Data

Nov. 1, 1996 (DE) .......................... 196 46 748

(51) Int. Cl.$^7$ .............................. G08B 13/14

(52) U.S. Cl. ................. 340/571; 340/573.1; 340/573.4; 340/568.1; 340/10.1; 340/825.57; 340/825.69

(58) Field of Search .............................. 340/571, 573.1, 340/573.3, 573.4, 573.5, 573.6, 568.1, 539, 10.1, 825.57, 825.65, 825.69

(56) References Cited

U.S. PATENT DOCUMENTS

| | | | | |
|---|---|---|---|---|
| 3,755,744 A | * | 8/1973 | Fukata | .................. 340/825.65 |
| 3,766,518 A | * | 10/1973 | Rilett | .......................... 367/112 |
| 3,969,725 A | * | 7/1976 | Couvillon et al. | ....... 343/6.5 R |
| 4,225,791 A | | 9/1980 | Martin | |
| 4,652,816 A | * | 3/1987 | Crookshanks | ............. 324/76.19 |
| 4,677,441 A | * | 6/1987 | Hofgen et al. | .............. 342/174 |
| 4,758,691 A | | 7/1988 | De Bryne | |

(List continued on next page.)

FOREIGN PATENT DOCUMENTS

| | | |
|---|---|---|
| DE | 36 18 416 | 3/1987 |
| DE | 39 28 571 | 3/1990 |

(List continued on next page.)

OTHER PUBLICATIONS

Kowatsch et al., "Spread–Spectrum–übertragung analoger Signale mit Chirp–Modulation", *Archiv Für Electronic und Übertragungstechnik*, vol. 36, No. 7, Jul. 1982, pp. 299–304 (Document XP002061685).

Utlaut, W.F., "Spread–spectrum principles and possible application to spectrum utilization and allication", *telecommunciation journal*, vol. 43, 1978, pp. 20–32.

Primary Examiner—Nina Tong
(74) Attorney, Agent, or Firm—Altera Law Group LLC

(57) ABSTRACT

Measuring and/or control system (1) for detection of the distance of an object (2) or of a person from a predetermined reference point, with a first transmitting/receiving device (10) for generation and wireless transmission of a control signal to a separate second transmitting and/receiving device (30), as well as for receipt of an acknowledgment signal generated from the second transmitting/receiving device (30) upon receipt of the control signal, whereby both of the transmitting/receiving devices display on the transmitting side a signal source (23, 24, 25, 26) that generates as a control and/or as an acknowledgment signal, pulses that display during the duration of the pulse a monotonically falling or rising frequency, or that consists of a superposition of these types of pulses in pairs, the other current transmitting/receiving device (10, 30) displaying on the receiving side for time compression of the received pulses, at least one dispersion filter (11) having a predetermined frequency-dependent signal transit time, which is matched-adapted to the transmitting side modulation such that the spectral signal portions of the control and/or acknowledgment signal, because of the frequency-dependent different signal transit time through the dispersion filter (11), appears at its output essentially coincidentally and, therewith, with little temporal imprecision.

30 Claims, 7 Drawing Sheets

U.S. PATENT DOCUMENTS

| | | |
|---|---|---|
| 5,070,500 A | 12/1991 | Horinouchi et al. |
| 5,105,294 A | 4/1992 | Degura et al. |
| 5,113,728 A | 5/1992 | Degura et al. |
| 5,325,394 A | 6/1994 | Bruckert |
| 5,381,798 A | 1/1995 | Burrows |
| 5,589,821 A * | 12/1996 | Sallen et al. .............. 340/573.1 |
| 5,870,054 A * | 2/1999 | Lewis ........................ 324/163 |

FOREIGN PATENT DOCUMENTS

| | | |
|---|---|---|
| DE | 32 16 666 | 11/1992 |
| DE | WO 96/18913 | 6/1996 |
| DE | 196 01 866 | 8/1996 |
| EP | 223 554 | 5/1987 |
| WO | WO 95/20277 | 7/1995 |

* cited by examiner

MEASURING AND/OR SECURITY SYSTEM

BACKGROUND OF THE INVENTION

1. Field of the Invention

The invention concerns a measuring and/or security system of the type given in the precharacterizing clause of Claim 1.

2. Description of Related Art

Measuring and security systems are needed today in a multiplicity of types for the most varied of applications. One of these is the protection of objects against theft.

A system of this type is known, for example, from the German published patent application DE 36 18 416 A1, and consists essentially of two transmitting/receiving devices, one of which is installed on the object to be protected, while the other is arranged in fixed fashion in a monitoring unit. During operation, the two transmitting/receiving devices communicate with each other, with the one transmitting/receiving device generating a control signal, to which the other transmitting/receiving device answers with an acknowledgment signal. After receipt of the acknowledgment signal, the transmitting/receiving device that radiates the control signal measures the time difference between the sending out of the control signal and the receipt of the acknowledgment signal, and upon exceeding a prescribed signal transit time triggers an alarm.

In the case of the previously-known measuring and/or security system, however, it is disadvantageous that the transmitting power required for a certain transmission of data between the two transmitting/receiving devices is relatively high.

For one thing, this limits the operating time of the security system, since the transmitting/receiving device installed on the object to be protected is battery operated. For another thing, because of the relatively high transmitting power, it can result in interference with other communication systems, in particular other security systems.

Therefore, the task underlying the invention is to obtain a measuring and/or security system of the initially-mentioned type having a reduced transmitting power.

This task, starting out from a measuring and/or security system based on the pre-characterizing clause of Claim 1, is resolved by the characterizing features of Claim 1.

SUMMARY OF THE INVENTION

The invention includes the technical teaching of generating on the transmitter side, as control and/or acknowledgment signals, pulses that shift in frequency over the duration time of the pulse, and of compressing these pulses on the receiver side by means of dispersion filters.

A dispersion filter of this type is, in principle, actually known from the European patent application EP 0 223 554 A2, without more detailed application instructions having been given.

The invention starts out from the knowledge that the pulses transmitted as control and/or acknowledgment signals, for achieving a high precision when measuring distance, may display only a slight temporal imprecision. On the other hand, in order to be able to transmit these types of short pulses, a relatively wide bandwidth is required.

With the invention a measuring and/or security system for measuring distance is created that is based on a measurement of the signal transit time, and that, even with a low transmitting power in signal-interference surroundings, nevertheless can operate with a minimum temporal imprecision of the emitted signal.

In the case of the measuring and/or security system in accordance with the invention, chirp signals are radiated for determination of transit time, said chirp signals being compressed in time in the receiver by a suitable dispersion filter, in order to achieve a low temporal imprecision as a presupposition for an exact distance measurement, and furthermore to raise the amplitude on the receiver side.

In addition to this, at least one of the transmission systems displays on the transmitting side a signal source that generates, as a measurement signal, pulses—also designated as chirp signals—having a frequency that falls or rises monotonically during the duration of the pulse and that corresponds to a prescribed, preferably linear, modulation characteristic curve. However, it is not necessary that the modulation characteristic curve be linear. It is critical merely that the frequency, in each instance, rise or fall monotonically, in the mathematical sense, over the duration of the pulse.

On the other hand, the receiving transmission system displays for pulse compression a dispersion filter having a frequency-dependent signal transit time corresponding to a prescribed filter characteristic curve. It is important here that the filter characteristic curve be matched to the proposed modulation on the transmitter side such that the signal portions of the modulated pulses corresponding to this modulation characteristic curve, because of the different frequency-dependent signal transit time through the dispersion filter, appear at its output essentially coincidentally, and subsequently with lesser temporal imprecision.

In one variant of the invention, as an approximation, a Dirac pulse is first generated and fed to a low-pass filter whose filter characteristic displays a peaking shortly before reaching the limit frequency, and therewith transforms the Dirac pulse into a sinc pulse, whose form is described by the known sinc function sinc $(x) = {}^{sin\ x}/_x$. The sinc-form output signal of the low-pass filter is next passed over to an amplitude modulator, which impresses on the carrier oscillation a sinc-form envelope. If the signal generated in this fashion is fed to a dispersion filter, then appearing at the output is a frequency modulated pulse. In this variant of the invention, therefore, there first follows on the transmitter side an expansion of the relatively sharp sinc-pulse through the dispersion filter into a frequency modulated pulse, which in comparison to the sinc-pulse is lengthened, and displays a correspondingly lower amplitude.

According to another variant of the invention, generation of the frequency modulated pulse, on the other hand, is accomplished by means of a PLL-loop (PLL: Phase Locked Loop) and a Voltage Controlled Oscillator (VCO). For this purpose, a square pulse is first converted into a sawtooth shaped pulse. The pulse generated in this fashion is then used for control of the VCO, such that the frequency of an output pulse increases or decreases linearly during the duration of the pulse.

In another variant of the invention, generation of the frequency modulated pulse is accomplished in the digital signal processing unit, which advantageously enables realization of random modulation characteristic curves.

The previously mentioned dispersion filters are preferably realized as Surface Acoustic Wave (SAW) filters, since these types of filters can be produced with a high degree of precision and stability. Moreover, these types of surface acoustic wave filters offer the advantage that amplitude response and phase response can be dimensioned independently of one another, which opens up the possibility of realizing, in a single structural element, the narrow band bandpass filter and the dispersion filter required in each receiver.

According to the invention, distance measurement between two previously described transmission systems is accomplished with one transmission system preferably being installed on or in the object of measurement, and with the other transmission system preferably being arranged in fixed fashion.

For distance measurement, the first transmission system generates, by means of a transmitter, a measuring signal that is radiated to the second transmission system and there detected by a receiver. Measurement of the signal transit time is accomplished by a time measuring device that is connected on the input side with the receiver of the second transmission system.

Interval determination is accomplished by determining the time duration of signal travel, to and return, between two transmitter and receiver pairs. Distance measurement is introduced herewith by the transmitter of the second transmission system emitting a measuring signal—also designated in the following as a control signal—to the receiver of the first transmission system. Upon receipt of this measuring signal, the receiver of this transmission system triggers the transmitter of the same transmission system, which, thereupon, emits a measuring signal as an acknowledgment signal, and transmits it to the receiver of the second transmission system.

The measured signal transit time here corresponds, therefore, to double the distance between the two transmission systems.

In the previously described variant of the invention, distance measurement between the two communicating transmission systems is accomplished by measuring the signal transit time between emission of the control signal by the one transmission system and the subsequent receipt of the outgoing acknowledgment signal from the other transmission system. In one advantageous variant of the invention, for increasing measurement accuracy provision is made for determining the internal signal transit times, and for taking into account in the calculation the distance between the communicating transmission systems.

In addition to this, the control signal generated on the transmitter side, without the detour over the other transmission system, is passed on directly to the receiver of the same transmission system. For example, it is additionally possible to use the same antenna for emission of the control signal and for reception of the acknowledgment signal, so that the control signal emitted on the transmitter side also directly reaches the receiver side of the same transmission system. Instead of this, however, it is also possible in normal operation to separate the transmitter and receiver of the individual transmission systems and to connect them together only in a time-limited fashion during the calibration procedure. Since in the case of direct control of the receiver the control signal is essentially stronger than the acknowledgment signal, in this variant of the invention it is advantageous to temporarily adjust the sensitivity of the receiver downward immediately after emission of the control signal so that the control signal does not over-control the receiver. After receiver side detection of the control signal emitted by the same transmission system, the time measurement device determines the internal signal transit time between the emission of the control signal and detection of the same control signal, which is then intermediately stored in a memory unit. Consideration of the internal signal transit time is then accomplished through a calculating unit that computes the distance between the two communicating transmission systems from the intermediately stored internal signal transit time and the total transit time determined by the time measuring device upon arrival of the acknowledgment signal. Since at any given time only the internal signal transit time in one transmission system is determined in the above-described manner, while the distance measurement is also falsified by the internal signal transit time in the other transmission system, the calculating unit preferably subtracts from the measured total transit time double the value of the internal signal transit time determined for one transmission system. It is also possible to determine the internal signal transit time in both transmission systems and to transmit it at any given time to the other transmission system, for example, together with the control and/or acknowledgment signal. In this case, the calculating unit subtracts from the total transit time the internal signal transit times determined for both transmission systems, which in the case of differently constructed transmission systems and consequently also of different internal signal transit times, brings about an improvement in measuring precision.

If other information-carrying signals besides the control and/or acknowledgment signal are transmitted between the two transmission systems, as for example the communication of the internal signal transit time in the previously described variant of the invention, this communication is then preferably accomplished with an error-correction code that enables recognition of a transmission error. The control and acknowledgment signal, by means of detection of corresponding recognition signals, enables a mechanism that ensures that only the signals of transmitter/receiver systems associated with one another trigger a measuring process. Therefore, through the use of chirp signals in accordance with the invention, it is possible for several like type systems to operate in coincident frequency bands next to each other, without interfering with each other.

In another advantageous variant of the invention, the measuring and/or security system serves for detection of the removal of an object from a predetermined area or for detection of penetration into the area of the object, in particular for protection against theft in a warehouse. As a rule, for this purpose a transmission system is installed on a movable object to protect it against unauthorized removal, with the supply of energy for this transmission system as a rule being provided by a built-in battery, so that maximum operation time of the security system is limited by the useful life of the battery.

In an improved variant of the invention, therefore, provision is made for reducing power consumption in order to increase the useful life of the battery. For this purpose, the transmitting power or the input amplification is matched to the transmission conditions prevailing at the place of use. Thus, in the case of weak interfering signals only low transmitting power and/or low input amplification is required, whereas, on the other hand, in strong interference surroundings, a correspondingly greater transmitting power and/or input amplification is needed. Therefore, the transmission system in this variant of the invention displays on the receiver side a field strength measuring system that, for one thing, measures the field strength of the signals sent from the other transmitter/receiver device and, for another thing, measures the noise in order to determine from this, with a calculator, the signal-to-noise ratio. The value determined in this way then serves for controlling a regulator that is connected at the output side to an input amplifier arranged on the receiver side for regulating the input amplification, or is connected to the transmitter that generates the control signal for regulating the transmitting power. Regulation of input amplification and/or transmitting power is accomplished such that the signal-to-noise ratio, on the one hand, does not fall below a minimum value required for normal transmission between the transmission systems, however, on the other hand, transmitting power is held as low as possible in order to not needlessly consume energy.

According to an advantageous development of the invention, the transmission systems of the electronic security system communicating with one another display control means for the purpose of carrying out the communication function of the security system transmission system in the case of intermittent operational management. This measure enables a further reduction of energy consumption and therewith an increased battery life.

With intermittent operation of the security system, transmitters and receivers of the communicating transmission systems work in the above-described way and manner, at any given time, for example, only 500 µs with a cycle time of one to two seconds.

This means that for a very long (electronic) time of about half a second they do not operate and, thus, for the battery delivering the supply voltage, an on/off duty cycle favorable for conserving energy can be realized.

Furthermore, the invention includes the teaching of encoding the control signal and/or the acknowledgment signal, in order to prevent an imitation of the acknowledgment signal for falsification purposes, for example by a thief.

In doing this it is particularly beneficial to not concentrate on increasing the complexity of the code, with correspondingly high expense for decoding, but rather to provide in advantageous fashion means through which a code that is used can be changed in a prescribed way.

According to a preferred embodiment of the invention, the anti-theft protection system displays two wireless transmission systems alternately communicating with one another, in which is provided in each case a transmitter and a receiver. The transmission of information advantageously occurs through high frequency-, light- or acoustic energy. The transmission systems communicating with one another are constructed essentially identically and in each case display primary electronic control means, such that the transmitting arrangement of the first transmission system can emit a coded control signal, which, after receipt by the second transmission system stimulates the latter to emit a coded acknowledgment signal intended for receipt by the first transmission system. Here, the coding of the acknowledgment signal is different from that of the control signal. After receipt of the acknowledgment signal in the first transmission system, this latter again emits a control signal that displays a code differing from the code of the last signal. In this way there results a continuous, alternating connection between the two communicating transmission systems of the security system in accordance with the invention. The code is changed in random fashion, with the speed of the alternating transmission being so great that, even with computers of highest computing power, no decoding could result within the available time. If decoding does result later, the code has already changed several times.

For increasing alarm security and for preventing disturbing interference by other similar systems located close by, the primary electronic control means are built into the transmission systems communicating with each other, such that the coding of control signal and acknowledgment signal is changed after each transmitting and receiving cycle.

The primary electronic control means display a code manager combined with a random number generator and a memory unit that, based on a distinct principle in accordance with the invention, controls the cyclically performed changing of the coding of the transmitted signals. The signal to be emitted from the respective transmitting arrangement is first generated by the random number generator and then encoded. The code $K_{n-1}$ is formed from an already-sent signal in order, in this manner, to receive as a key an actually statistically varying code, dependent, however, on the prior operational management of the two communicating transmission systems. This code is stored in recallable fashion in the memory unit. The signal to be sent is encoded based on the preceding code $K_{n-1}$, and transmitted. At the same time, the transmitter of the one transmission system forms from the actual random number and the code $K_{n-1}$ a new code $K_n$, and stores it in the memory.

The signal originating from the transmitter is decoded and checked for compatibility by the other transmission system via the applicable key $K_{n-1}$ that is known from the previous transmission. The result is recognized in this transmission system, stored, and drawn upon for forming a new code $K_n$, which the transmitter of the other transmission system had already formed before emission of the signal. The transmitter of the transmission system generates a new signal via the appropriate random number generator, codes it according to $K_n$ and sends it to the first transmission system. Simultaneously formed and stored thereby is the code $K_{n+1}$. The receiver of the now receiving transmission system can decode the signal sent from the other transmission system, since it itself has formed the code $K_n$.

Since the transmitters and the receivers of the two transmission systems communicating with each other have, since the first initialization, regularly started out from the same signal basis, and the statistically generated signals are known through the preceding signal dialog, of pressing importance, in an advantageous way, in the security system is a code constantly changing in a selectably-adjustable cycle. This code, because of the correlation at any given time with the previous signal dialog, is known, however, only to the two transmission systems communicating with each other, and can also be checked only by them for compatibility.

Available by this means is a measuring and/or security system that offers, in an advantageous manner, an extremely high security factor for its operating management, and which cannot be compromised by intruders, because of the continually changing code and the indeterminable operating cycle.

The above-described security system is also suitable in this form as a warning system for forgotten objects, for example money purses and appointment books in telephone booths, or as a security system for adults who would wish to maintain control of their children who are to be watched over in a larger group of people.

In accordance with the preferred form of embodiment of the invention, the transmission systems of the security system communicating with each other are constructed in the form of a chip card or as a small-format utility object, for example as a cigarette lighter. In this way, they are capable of being produced economically as a mass-production article, and, among other things, offer a further field of application in combination with a bank card, credit card or identity card.

A multi-layer construction is beneficial in the manufacture of the transmission systems of the security system as mass production articles in the form of chip cards, in order to take into account space expansion for the power supply sources, audible alarm systems and/or means for programming the primary electronic control means.

In accordance with another advantageous development of the invention, to expand the area of action of the measuring system in a simple way, several like-constructed transmission systems are positioned at control points, maximally at an interval between each other of the greatest coverage of the transmitter used. The object (objects) to be protected is (are), in each case, to be provided with a transmission system. In the case of unauthorized departure from the permitted area, at least one of the transmission systems reacts by triggering an alarm.

In the case of an expanded activity area of the measuring system, in order to prevent the dialog of the transmission systems connected to each other at any given time from being disturbed, for example by an overlapping frequency or interference phenomena, there occurs through the second electronic means an automatic shifting of the dialog time window for the respective pair. This is possible without problem, since, with a cycle time of preferably 1 sec. for the random number generator and a transmitting time of about 500 $\mu$s in a so-called staggered operation, more than one thousand time windows can be realized. The shifting of the time window used for transmission of the control signal and the acknowledgment signal is advantageously accomplished here randomly, in order to prevent the two pairs of transmission systems from shifting their transmission window together, which, in spite of the present shift, would lead to a constant overlapping and mutual interference.

Even in the case of this type of random shifting of the time window provided for transmission of control and/or acknowledgment signal, it is, however, possible that the time windows of two pairs of transmission systems briefly coincide. In this case, transmission between the transmission systems would be disturbed, such that the exchange of control and acknowledgment signal would not function. Therefore, in the preferred form of embodiment of this variant provision is made to trigger the alarm only when the acknowledgment signal also fails to appear for a predetermined number of control signals, so that short transmission disturbances will not lead to triggering an alarm. For this purpose, the transmission systems display a storage element in which are stored the number of already-omitted acknowledgment signals.

With omission of an acknowledgment signal, the content of this storage element is incremented, where on the other hand, the storage element is reset upon appearance of an acknowledgment signal. Moreover, the transmission systems in this variant of the invention display a comparison unit that compares the content of the storage element with a predetermined limit value, and upon exceeding the limit value triggers an alarm.

In another variant of the invention, provision is made on the transmitter side to generate different angle-modulated pulses, and at the receiver end to compress these by means of appropriately matched dispersion filters. If the information-carrying signal is present in binary form as a bit sequence, then, in the case of a logical LOW-level, it is possible to transmit a linearly-increasing frequency during the duration time of the pulse, where on the other hand, in the case of a logical HIGH-level, a pulse having a linearly-decreasing frequency is transmitted during the duration time of the pulse. In this case on the receiver side two dispersion filters are required with appropriately matched, frequency-dependent transit time characteristics.

By transmission of differently angle-modulated pulses, it is possible, for one thing, to actively transmit both logic LOW-levels as well as HIGH-levels, which contributes to increasing protection against interference. For another thing, the possibility here arises of transmitting a greater amount of data with each transmission pulse. For example, if eight different pulses are available for the transmission, it is then possible to transmit with each pulse an amount of data of $\log_2 8=3$ bits.

BRIEF DESCRIPTION OF THE DRAWINGS

Advantageous developments of the invention are represented in more detail with the aid of figures, together with the description of the preferred form of embodiment of the invention. Shown are.

DETAILED DESCRIPTION OF THE INVENTION

Figure 1:
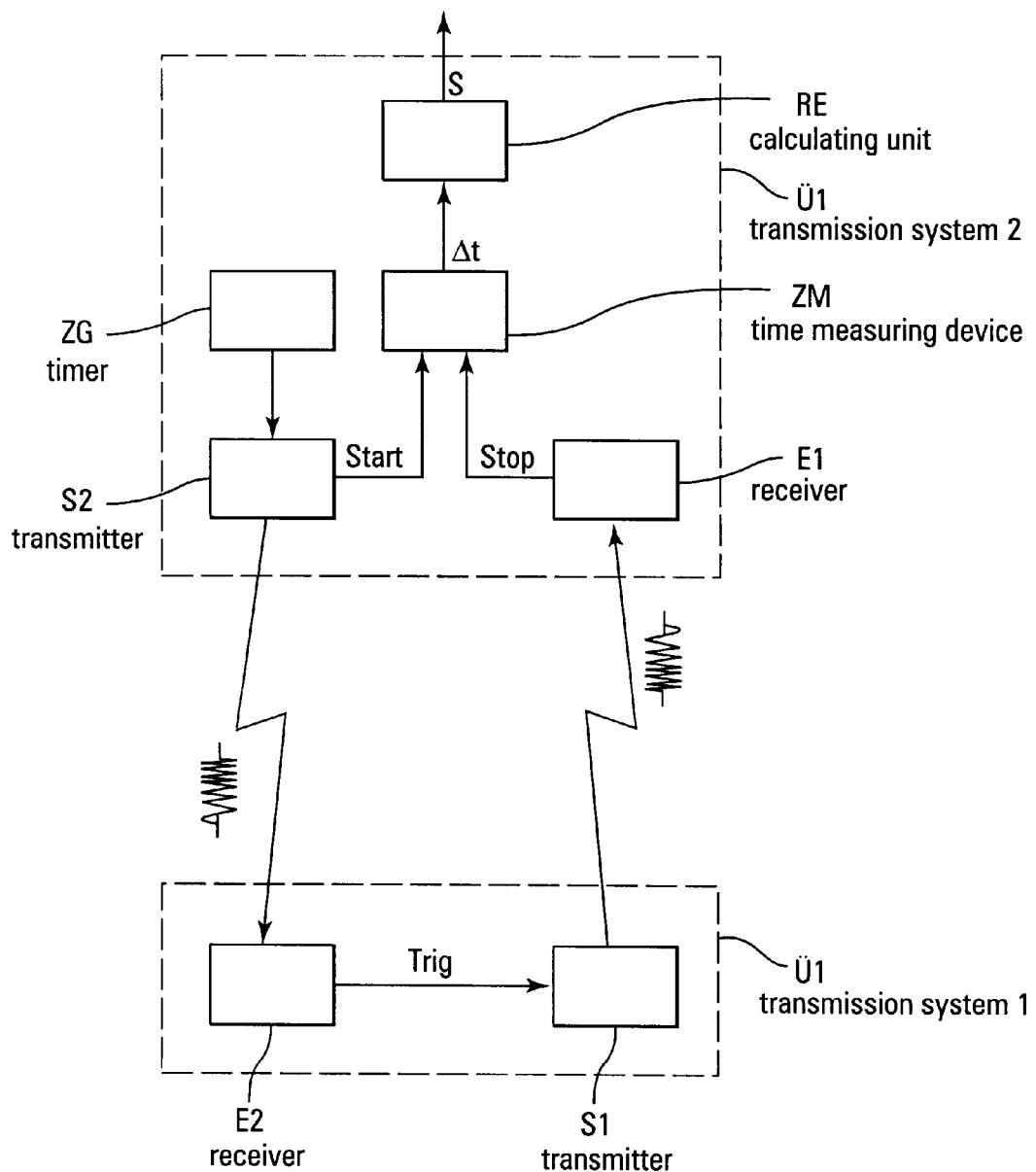
FIG. 1 a measuring and/or security system in accordance with the invention with two transmission systems communicating with each other, as a block diagram.

The measuring and/or security system represented in FIG. 1 in the form of a block diagram enables determination of the distance between the first transmission system Ü1 and the second transmission system Ü2 by measuring the transit time of a signal that is generated by the transmitter S1 of the first transmission system Ü1 and that is detected by the second transmission system. The construction of the transmitter S1 and receiver E1, as well as the type of signals transmitted between the two transmission systems Ü1, Ü2, is explained in detail in the description for FIGS. 2 and 3. For a time measurement it is necessary that the receiving transmission system Ü2 receive information concerning the point in time of signal emission in the first transmission system. Signal emission by the transmitter S1, therefore, at any given time, occurs at prescribed points in time that are determined by the timer ZG. It is important here that the timer ZG displays a high accuracy, since time deviations from the given point in time of emission of the signals lead to errors in transit-time measurement, and therewith falsify the distance measurement. Hence the timer ZG generates a highly precise, periodic timing signal that causes the transmitter S1 to emit a pulse.

The individual measurement processes occur here at predetermined time intervals and are, in each case, introduced by the timer ZG, which triggers the transmitter S2 for emitting a measurement signal that is detected by the receiver E2 of the other transmission system Ü2 after a distance-dependent signal transit time. The receiver E2 then triggers the transmitter S1 for emitting an acknowledgment signal, which, in turn, is received by the receiver E1 after a distance-dependent signal transit time.

Measurement of the signal transit time is accomplished through the time-measuring system ZM that is connected on the input side with the transmitter S2, in order to start measuring the time when the measurement signal is emitted by the transmitter S2. Moreover, the time-measuring system ZM is connected with the receiver E1, in order to end the time measurement upon arrival of the acknowledgment signal. The time-measuring system ZM therefore determines the signal transit time $\Delta t$ between emission of the measurement signal by the transmitter S2 and reception of the acknowledgment signal by the receiver E1. Next, the measured signal transit time $\Delta t$ is furnished to the calculating unit RE, which, from this and from the presumably-known speed of propagation of the exchanged signals, measures the distance s between the two transmission systems.

Figure 2:
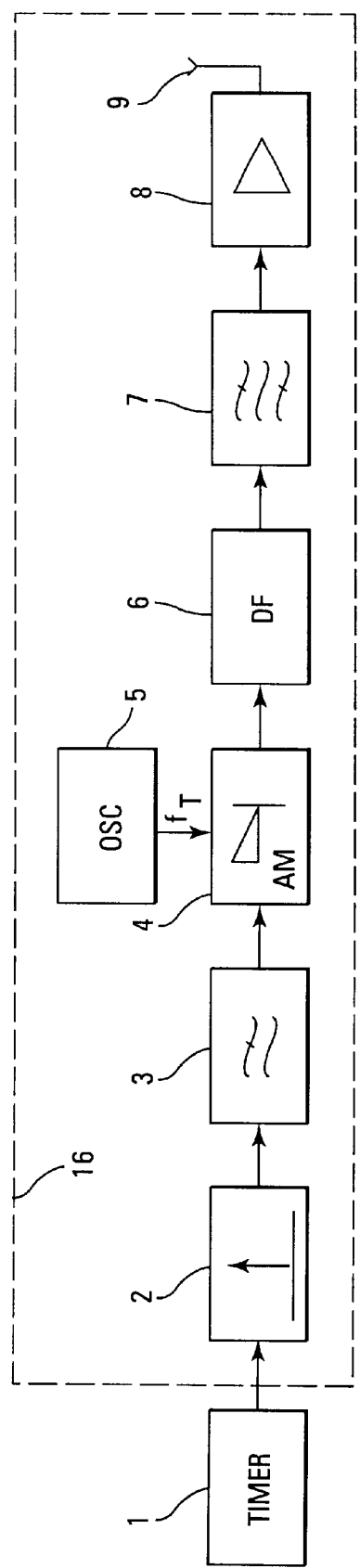
FIG. 2 a transmitter of the transmission systems represented in FIG. 1, as a block diagram FIG. 3 a receiver of the transmission systems from FIG. 1, as a block diagram FIG. 4 a schematic illustration of the basic principle of the measuring system in accordance with the invention when used as an anti-theft security system, FIG. 5 an advantageous development of the anti-theft security system represented in FIG. 4, FIG. 6 the representation of a block diagram of one of the transmission systems communicating with each other of the anti-theft security system in accordance with the invention, FIG. 7 the representation of an individual unit in accordance with FIG. 6, FIG. 8 the preferred form of embodiment of the communicating transmission systems of the anti-theft security system in accordance with the invention, and FIG. 9 the construction of one of the transmission systems communicating with each other shown in FIG. 5, in an exploded representation.

The structure of the transmitters S1, S2 in the above-described transmission systems Ü1, Ü2 is represented in detail in FIG. 2. The transmitter 16 enables the transmission of a high-frequency pulse over an interference-impaired transmission distance to the receiver 17 represented in FIG. 3, whereby transmission with the prescribed requirements for range and protection against interference can be advantageously accomplished with a relatively low power, which, for one thing, in the case of battery operation increases the useful life of the battery and, for another thing, reduces environmental pollution by electromagnetic radiation—also designated as electro-smog. Moreover, because of the relatively low transmitting power, the transmitter displays a reduced potential for interference compared to other information transmission systems.

A trigger pulse appearing at the input of the transmitter 16 and generated by the timer 1 is first supplied to a pulse shaper 2 that transforms the relatively wide square pulses of the input signal into short spike pulses, which are said to form Dirac pulses.

The spike pulses thus formed are next supplied to a low pass filter 3 whose behavior displays a peaking shortly before the limit frequency, such that the individual spike pulses, at any given time, are transformed into sinc pulses whose shape corresponds to the known sinc-function sinc $(x) = {}^{sin\ x}/_x$.

In connection with this, the sinc-pulses are supplied to an amplitude modulator 4 that modulates this signal onto a carrier oscillation having a frequency $f_t$ generated by the oscillator 5, so that generated at the output of the amplitude modulator 4 is a carrier frequency pulse having a sinc-shaped envelope.

Connected downstream of the amplitude modulator 4 is a dispersion filter 6 that filters the modulated carrier frequency signal based on its linearly-falling angle modulation characteristic, whereby the angle modulation characteristic reproduces the frequency-dependent differential transit-time behavior of the dispersion filter 6. Therefore, appearing at the output of the dispersion filter 6 are linearly frequency-modulated pulses of constant amplitude, whose frequency drops off during the duration time of the pulse from a value $f_t + \Delta f/2$ lying above the carrier frequency $f_t$ to a value $f_t - \Delta f/2$ lying below the carrier frequency $f_t$.

The pulses generated in this manner are subsequently supplied to a bandpass filter 7 whose center frequency is equal to the frequency f of the frequency modulated pulse, so that signals lying outside the transmission band, which possibly stem from interference, are filtered out. The bandpass-limited signal is finally supplied, via a transmitting amplifier 8, to the antenna 9 and radiated.

Figure 3:
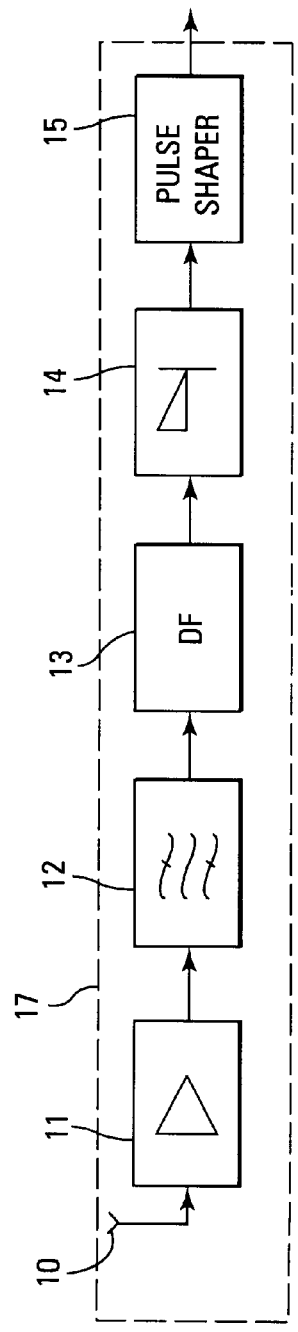

The receiver 17 represented in FIG. 3 enables reception of the linearly frequency-modulated signals radiated from the above described transmitter 16, as well as demodulation and recovery of the input pulse.

In addition to this, the signal received over the receiver antenna 10 is first supplied to a preamplifier 11 and then to a bandpass filter 12 whose center frequency is equal to the carrier frequency $f_t$ of the bandpass-limited transmitting signal, so that interfering signals from other frequency ranges are filtered out of the received signal.

Therefore, the received signal consists of linearly frequency-modulated pulses, where the frequency corresponding to the modulation characteristic used on the transmitter side drops off during the duration of the pulse from a value $f_t + \Delta f$ lying above the carrier frequency $f_t$ to a value $f_t - \Delta f$ lying below the carrier frequency $f_t$.

The received signal is then supplied to a dispersion filter 13 that temporally compresses the individual pulses of the input signal, which leads to a corresponding increasing of the amplitude, and therewith, an improved signal-to-noise ratio.

Hereby, pulse compression makes use of the fact that the high frequency signal portions of the pulse, because of the linear frequency modulation carried out on the transmitter side, appear at the input of the dispersion filter 13 before the low frequency signal portions. The dispersion filter 13, therefore, compensates the "lead" of the higher frequency signal portions, due to the fact that the latter are more strongly delayed in the dispersion filter than the low frequency signal portions. The frequency-dependent differential transit-time behavior of dispersion filter 13 is hereby matched to the modulation characteristic of the frequency modulation carried out at the transmitter end, in a manner such that the spectral signal portions of the received signal appear essentially coincidentally at the output of the dispersion filter 13, and, therewith, superpose to a signal having, at any given time, with respect to pulse shape, sinc-shaped envelope curves, whereby the amplitude of the individual pulses is essentially increased, compared to the received linearly-modulated signal.

The output signal of the dispersion filter 13 is then supplied to a demodulator 14, which releases the signal from the high frequency carrier oscillation, and generates a discrete output signal having spike-shape pulses.

In connection with this, recovered from the spike-shape pulses by means of the pulse shaper 15 is the original pulse generated on the transmitter side.

Figure 4:
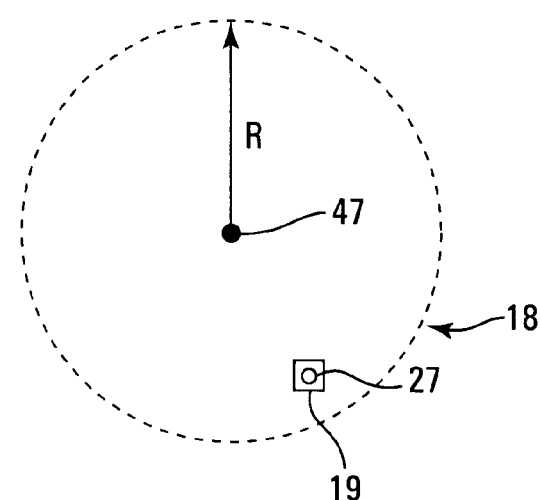

FIG. 4 shows a variant of the measuring system in accordance with the invention for use as an anti-theft security system. The security system 18 in accordance with the invention displays two wireless, alternately-communicating transmission systems 27 and 47, using coded signals. The first transmission system 27 is attached to the object 19 that is to be protected, the second transmission system 47 is located at a controllable place. Communicating between the transmission systems 27 and 47 is possible only within the circle (represented by a dashed line), corresponding to a set range for the transmitter arrangement used in the transmission system. If signal reception is interrupted because the object 19 to be protected has been removed without authorization from the area limited by the circle having the radius R, or if a transmitted signal can not be recognized as "in order" because of an unauthorized and, therefore, erroneous coding, an alarm is triggered, at least in the transmission system 47 that is acting as a "central station".

Figure 5:
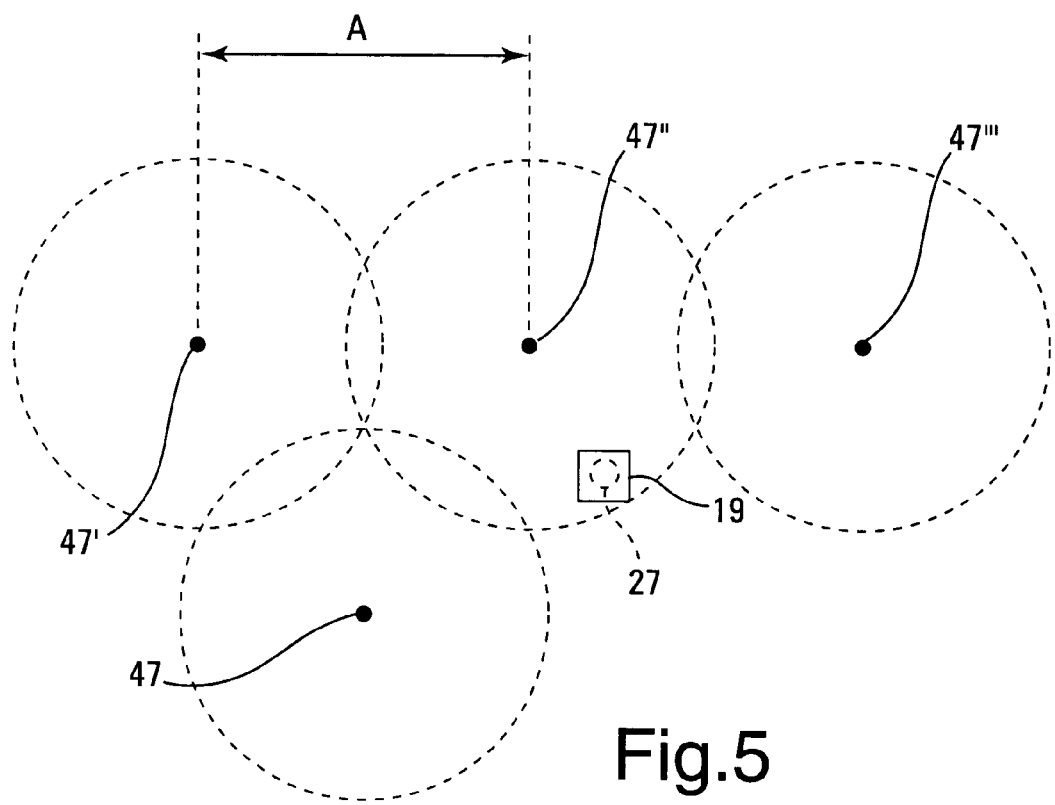

In the event that the activity area of the security system 18 based on FIG. 4 is to be expanded, in accordance with FIG. 5 several transmission systems 47, 47', 47" and 47''' displaying like-constructed transmitting and receiving arrangements are positioned at control points maximally to each other at an interval of the greatest range of the transmitting arrangements used. The object 19 to be protected supports another transmission system 27, and can be moved within the area delimited by the circles without danger of triggering an alarm, since the transmission system 27 can communicate with at least one of the transmission systems 47, 47', 47" or 47'''.

The solution is usable, for example, in an enterprise where important documents stored in a filing cabinet are to be available for exchange not only in one department, but rather in several departments of an enterprise, however, where unauthorized removal of these documents from the authorized departments for examination needs to be controlled and/or prevented. The file cabinet 19 to be "monitored" is provided with a first transmission system 27. When leaving the authorized area, at least one of the second transmission systems 47, 47', 47" or 47''' triggers an alarm.

Figure 6:
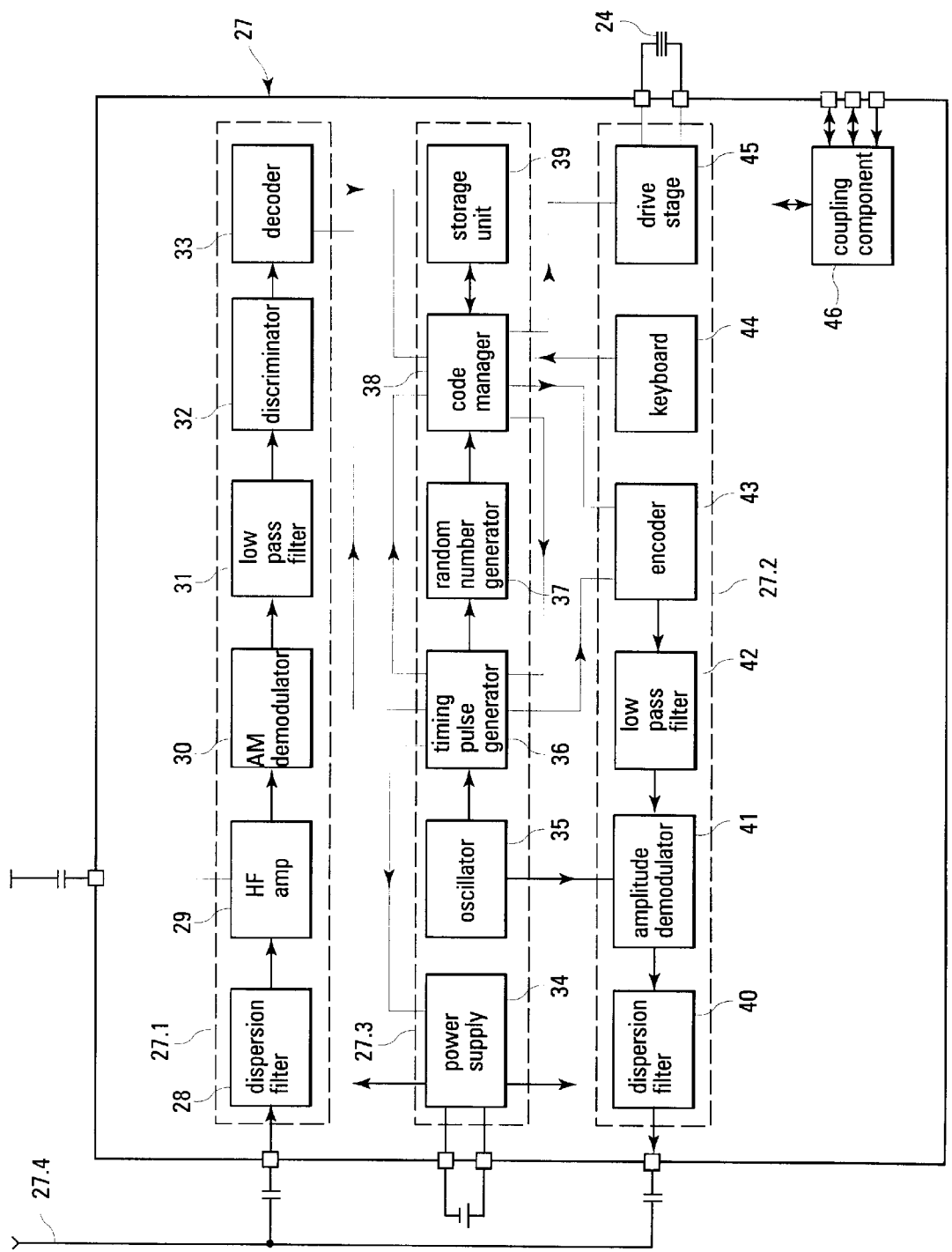

The block diagram shown in FIG. 6 of one of two transmission systems 27 communicating with one another in wireless fashion and using a code displays a receiving arrangement 27.1, a transmitting arrangement 27.2 and primary electronic control means 27.3. The second of the transmission systems communicating with one another is constructed in the same way (compare item 47 in FIG. 4).

The signal sent from the transmitting arrangement of a second transmission system (compare item 47 in FIG. 4), supplied to the receiving arrangement 27.1 of the first transmission system via the antenna system 27.4, consists of pulses linearly increasing in frequency during the duration of the pulse. This means that, at any given time, the low frequency signal portions of the individual pulses appear at the antenna 27.4 before the high frequency signal portions. The signal received over antenna 27.4 is first supplied to a dispersion filter 28 designed as a surface wave filter that displays a frequency-dependent signal transit time. The filter characteristic of this dispersion filter 28 is here matched to the modulation of the pulses radiated by the other transmission system such that the spectral signal portions of the frequency modulated pulses, because of the frequency-dependent different signal transit time through the dispersion filter 28, appear at its output essentially coincidentally, and subsequently with higher temporal precision. Therefore, the dispersion filter 28 leads to a time compression of the received pulses, which, because of the therewith associated higher temporal precision of the received pulses, makes possible an improved transit-time measurement between the two transmission systems and, therewith, a more precise distance measurement. Moreover, the time compression through the dispersion filter leads to a corresponding increase in amplitude of the received pulses in the receiver. This enables a decrease in transmitting power and, therewith, an increase in battery life, or operation in surroundings with interference.

The signal compressed in this manner is next amplified by a HF-amplifier 29 and demodulated by an AM-demodulator 30. After this, the signal is fed to another low-pass filter 31, and after passing through a discriminator unit 32 is supplied to a decoder unit 33.

The output of the decoder 33 is connected to the input of a code manager 38, a subassembly required for the alternate encoding of the transmitting signals associated with the primary electronic control means 27.3. For exact time-triggering of the transmitting signals, time-precise coordination of the received signals as well as control of the decoder 33, a timing pulse generator 36 controlled by an oscillator 35 is planned. This timing pulse generator likewise controls a random number generator 37 provided for generating the transmitting signal, the output signals of the random number generator receiving their actual codes, at any given time, from the code manager 38. This code, impressed on the transmitting signal in an encoder 43 associated to the transmitting arrangement 27.2 of the transmission system, is simultaneously placed in the storage unit 39 and from there, corresponding to the control system, is demanded by the code manager 38, through the timer 36, for the purpose of forming a new code required for the next transmitting and receiving cycle.

For increasing the security factor for a trouble-free operation of the security system, provision is made in the transmission systems communicating with each other for primary electronic control means through which the coding of the transmitting signals is changed after each transmitting and receiving cycle.

Coding is carried out according to the following principle:

The signal to be emitted by the transmitting arrangement 27.2 of the transmission system 27 is first generated through the random number generator 37 and then encoded. The code $K_{n-1}$ is formed from an already-sent signal, in order, in this way, to obtain as a key an actual, statistically-changing code as a function, in each case, of the prior operational management of the two transmission systems 27, 47, said key being stored in the storage unit 39 in recallable fashion. The signal to be transmitted is encoded based on the preceding code $K_{n-1}$, and transmitted. At the same time, formed through the first electronic means 27.3 of the first transmission system from the current random number and the code $K_{n-1}$ is a new code $K_n$, which is supplied to the memory 39 for storing. The signal originating from the transmitting arrangement is decoded and checked for compatibility by the receiving arrangement of the second transmission system via the applicable key $K_{n-1}$, which is known from the previous transmission. The result is recognized in the receiving arrangement of the second transmission system 47, stored and drawn upon for forming a new code $K_n$, which the transmitting arrangement of the first transmission system formed just before emission of the signal. The transmitting arrangement of the second transmission system 47 generates, via the appropriate random number generator, a new transmitting signal, encodes it based on $K_n$ and sends it to the receiver arrangement 27.1 of the first transmission system 27. In doing this, the code $K_{n-1}$ is simultaneously formed and stored. The receiving arrangement of the first system can decode the signal sent by the second transmission system since it itself formed the code $K_n$.

The individual pulses of the code generated by the encoder 43 are subsequently modulated and radiated via the antenna 27.4. Here, for one thing, the task of the modulation is to impress the signal generated by the encoder 43 onto the high frequency carrier signal generated by the oscillator 35, which is a prerequisite for a wireless transmission. For another thing, this allows the radiated signals to display a linearly increasing frequency during the pulse duration time.

This is required in order to be able to then compress the pulses in the receiver of the other transmitting/receiving arrangement by means of a dispersion filter.

In each case, the signal generated by the encoder 43 consists of spike-shaped pulses that resemble Dirac impulses, and is supplied to a low pass filter 42 whose filter characteristic curve displays a peaking shortly before reaching the limit frequency, and therewith transforms each Dirac pulse into a sinc-pulse, whose shape is defined by the known sinc-function $\text{sinc}(x) = \sin x / x$. The sinc-shaped output signal of the low pass filter 42 is next passed on to an amplitude demodulator 41, which impresses a sinc-shaped envelope curve onto the carrier oscillation generated by the oscillator 35. If the signal generated in this fashion is supplied to a dispersion filter 40, a frequency modulated pulse then appears at the output. Therefore, in this variant of the invention there follows on the transmitter side through the dispersion filter 40, first an expansion of the relatively sharp sinc-pulses into a frequency-modulated pulse that is lengthened in comparison to the sinc-pulse, and that displays a correspondingly lower amplitude. Following then at the receiver end is again a compression of the pulse, likewise through a dispersion filter, with a corresponding raising of the amplitude.

The code manager 38 is constructed to be programmable through a keyboard 44. Provided for the audible alarm indicator 24 is a separate driver stage 45, control of which is accomplished via the code manager 38. The power supply, which is intermittently connected with the receiving arrangement 27.1 and the transmitting arrangement 27.2 is designated by 34. Provided for the purpose of connection of peripheral transmission systems is a coupling component 46, over which the alarm signal can be transmitted to other stations.

Since the two transmission systems 27, 47 that are connected to each other display, since the first initialization, the same "coding past", and in each case the signals statistically generated but interchanged between one another are actually known to them, communication between the two transmission systems 27, 47 can be carried out with a continually-changing code. However, this code is understandable only to the two transmission systems through the correlation of the previous coding, so that intervention into the communication between the transmission systems by unauthorized persons is excluded, with limiting probability of security, and the security system can be operated with a high security factor.

Figure 7:
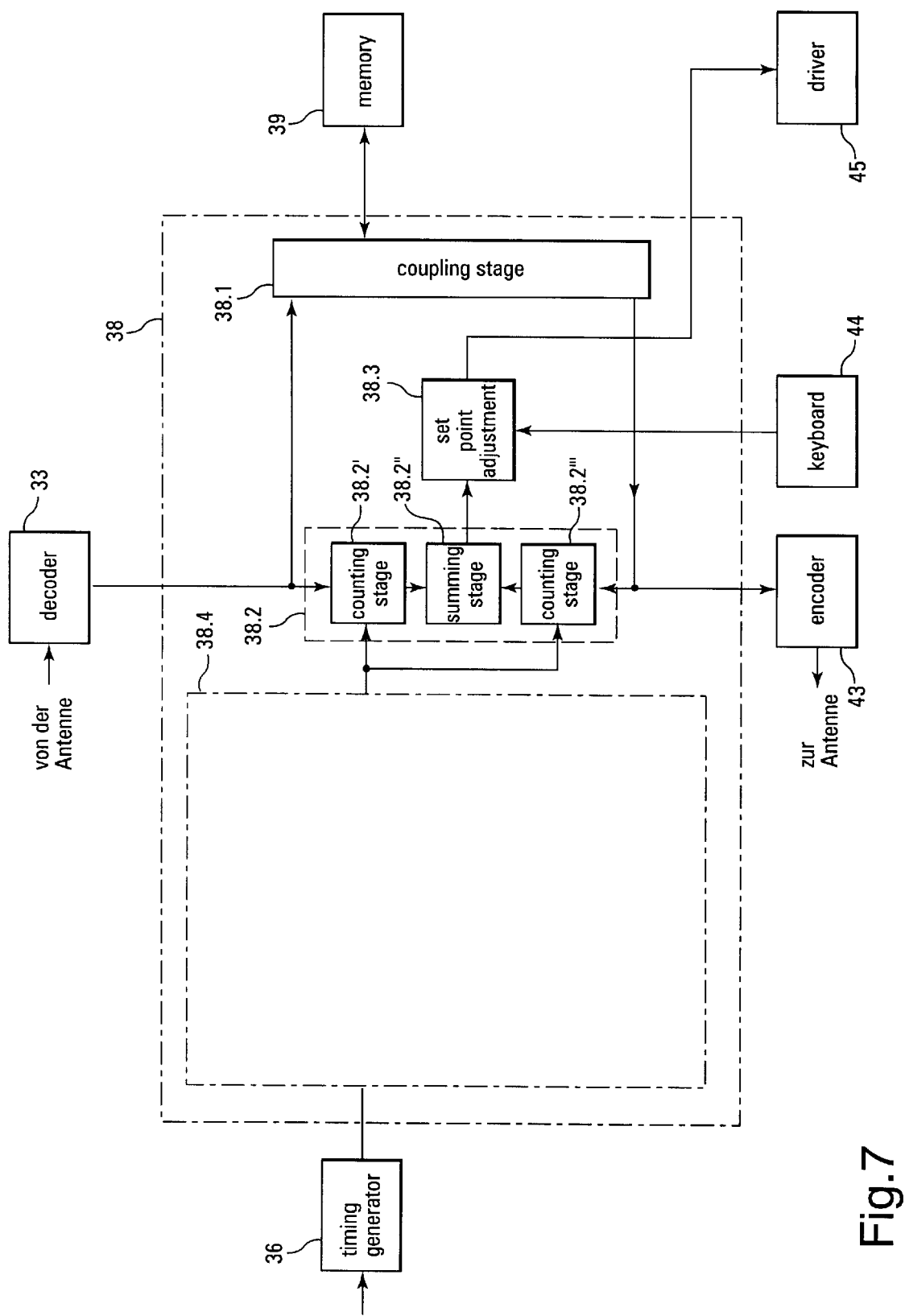

The representation in FIG. 7 shows, as details of the block diagram of FIG. 6, the technical circuit particulars 38.2 of the code manager 38, which are provided for the transit-time measurement required for determination of the interval between the transmission systems that are communicating with each other. The counting stages 38.2' and 38.2''' are connected with the timing generator 36, and are activated or stopped respectively when the coded signal leaves the appropriate transmitting arrangement of the first transmission system or when the signal immediately triggered by this in the second of the transmission systems communicating with each other arrives at the appropriate receiver arrangement of the first transmission system (compare item 27 (and/or 47), 27.1, 27.2 in FIG. 5). The result from the counter is received in a summing state 38.2'', the output of which is connected with a comparator having the set point adjustment 38.3. The set point setting can be entered with a keyboard 44. With a certain, presetable deviation in the set point, the comparator 38.3 activates the driver stage 45 of the audible alarm device. The coupling stage to the memory 39 provided for the code manager 38 is designated with 38.1.

All other function units are gathered together in the electronics block 38.4.

Figure 8:
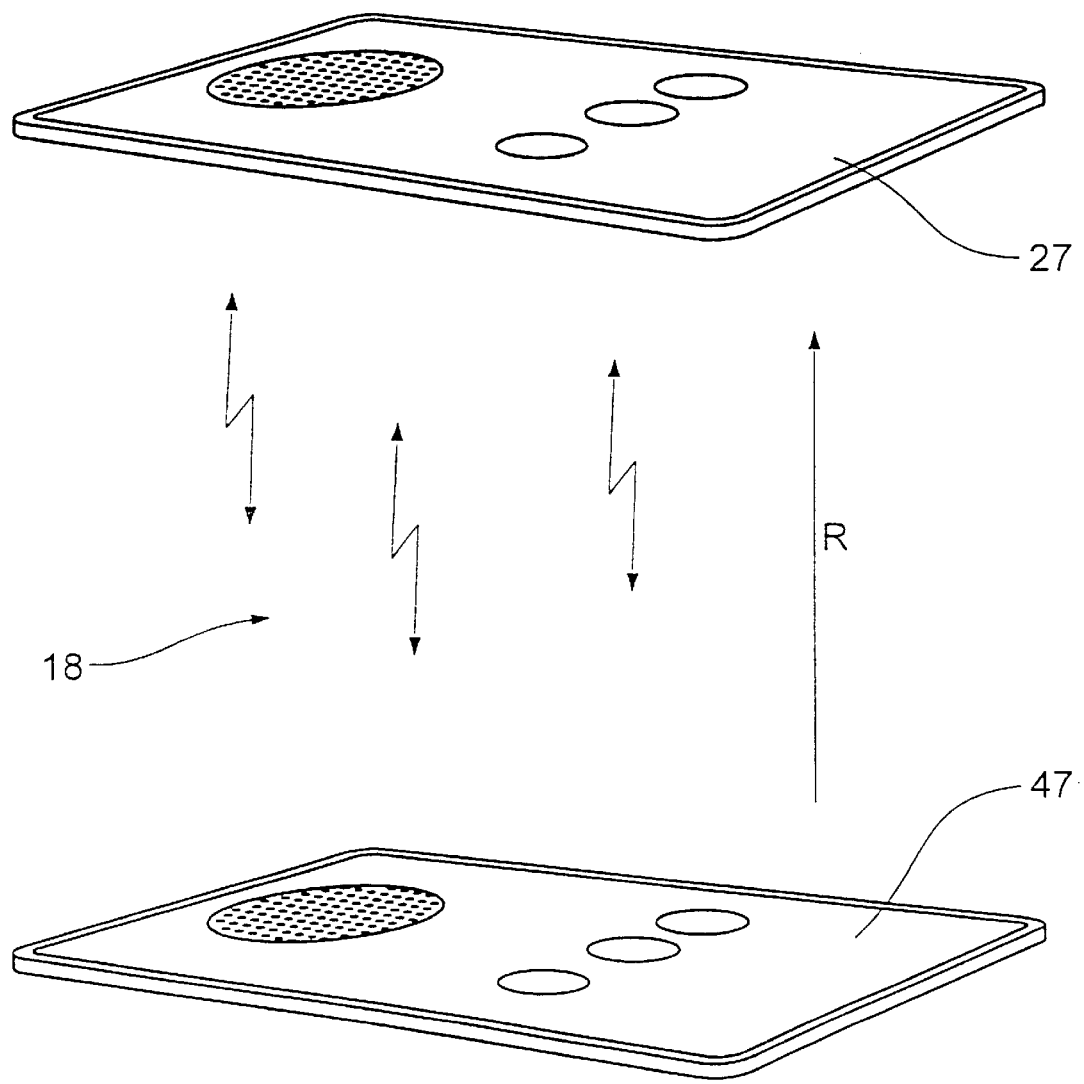
Figure 9:
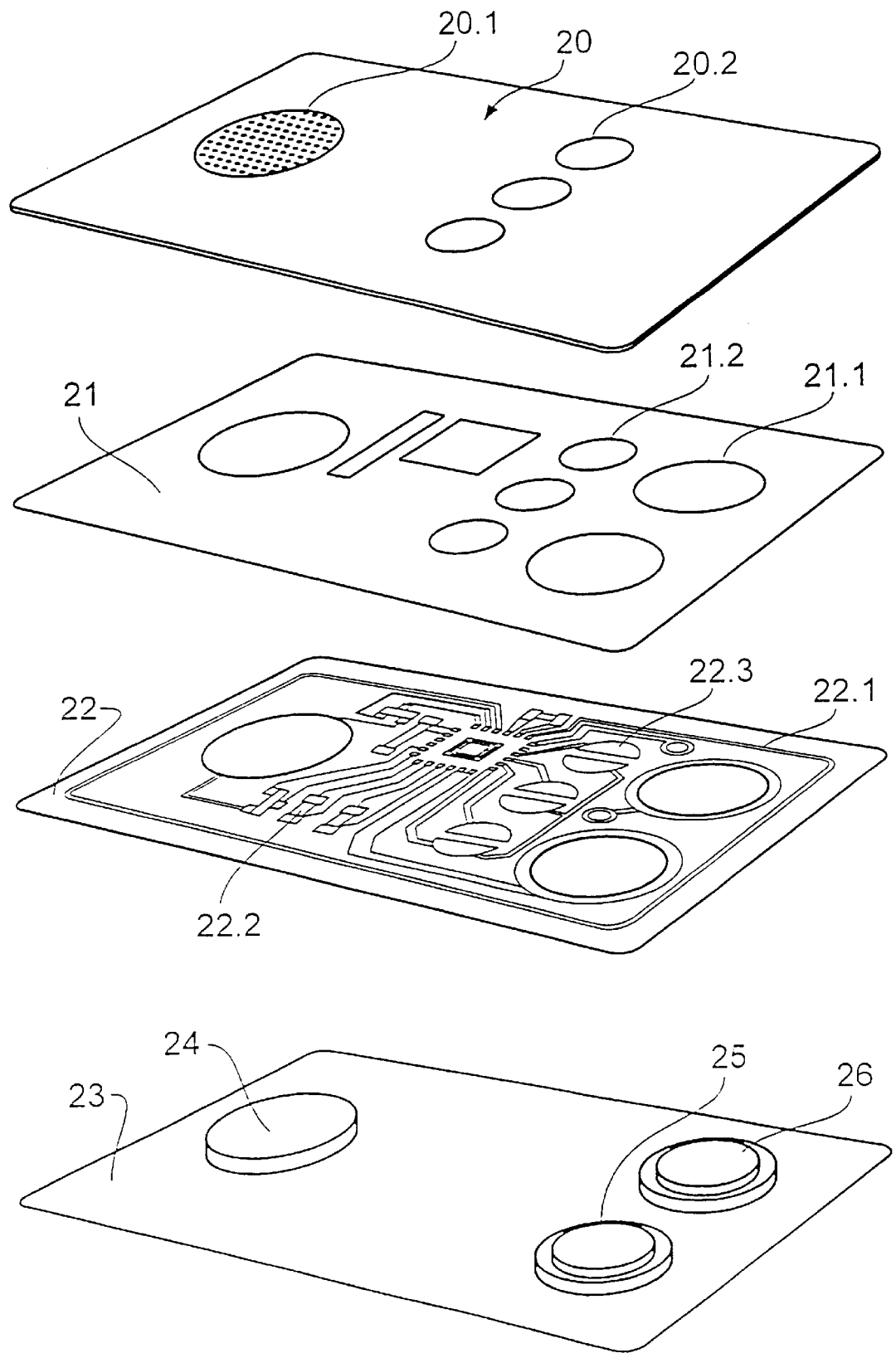

FIGS. 8 and 9 show in schematic form a security system 18 and the construction of the transmission systems communicating with each other 27 and 47, which are located at an allowable distance apart R.

Shown in FIG. 9, transmission systems 27, 47, which are similarly constructed and are formed as chip cards, are composed of four layers 20, 21, 22, 23. Formed in the top layer are a covering 20.1 for the audible alarm device 24 and keys 20.2 for programming the code manager (compare item 38 in FIGS. 6 and 7). A spacer layer 21, with cutouts 21.1 and 21.2 for batteries 25, 26 and the keys 20.2, separates the one layer carrying the printed circuit along with the electronic components (PCB-layer, Printed Circuit Board) 22 from the top layer 20. The contact areas for the programming keys 20.2 are designated with 22.3. The conductor path 22.1 represents the antenna required for wireless communication (compare item 27.4 in FIG. 6). Arranged on the bottom layer are the audible alarm device 24 and the batteries 25 and 26 required for the power supply.

The invention does not limit itself to the preferred example of a design given above. More to the point, a number of variants are conceivable that make use of the represented solution, even in the case of differently formed designs. In particular, the system is also suited in the way described for checking the proximity of persons, and even as an identification system, namely if the alarm, in the case of undesired separation of the devices from one another, is replaced by an alarm where, by additional appropriate means, no code agreement is established for the approach of two devices of corresponding type construction.

In particular, one of the cards can be arranged in fixed fashion or can be attached to a conveyance means or vehicle, in order to limit its movement radius. Here, the invention is also suited for systems where an authorizing-identification is to be transmitted that should not be able to be copied by listening third parties, in order to prevent imitation of the code. Another form of design extends to variants where, with reference to signal transmission, three or more devices are connected together in the form of a ring.

The invention is not limited in its design to the preferred examples of embodiment given above. More to the point, a number of variants are conceivable that make use of the represented solution, even in the case of basically differently formed designs.

If distance needs to be determined between several movable and fixed reference points (for example in the case of trucks) in relation to radio beacons, the system in accordance with the invention can also be used as a navigation system, whereby the current spatial position can be determined by ascertaining the distances through use of simple geometric relationships (hyperbola navigation).

What is claimed is:

1. Security system for detection of an object in an area, comprising:
   at least a first and a second transmission system coupled by a wireless connection;
   wherein one transmission system is attached to the object;
   a signal source located in one of the transmission systems that generates a signal of output pulses having, during the duration of the pulses, a monotonically changing frequency;
   wherein the second transmission system transmits a control signal to the first transmission system, and upon receipt of the control signal, the first transmission system transmits an acknowledgement signal to the second transmission system;

a dispersion filter located in one of the transmission systems that is matched to the signal source and has a predetermined frequency-dependent signal transit time such that the spectral signal portions of the pulses appear at the output of the dispersion filter with slight temporal imprecision essentially coincidentally;

a time-measuring device located in the second transmission system that measures the signal transit time between emission of the control signal and receipt of the acknowledgement signal;

a calculating unit connected with the time-measuring device that calculates a measurement and generates an alarm signal as a function of signal transit time.

2. Security system according to claim 1, wherein the second transmission system has a transmitter for emission of a control signal, and wherein the first transmission system has a receiver and a transmitter that are connected together for triggering the emission of the acknowledgement signal through receipt of the control signal, and wherein the time-measuring device, for measuring the total transit time between the emission of the control signal and receipt of the acknowledgement signal is connected with the receiver and the transmitter in the second transmission system.

3. Security system according to claim 1 wherein the calculating unit calculates an average from several signal transit times measured by the time-measuring device.

4. Security system according to claim 3, further comprising:

a second calculating unit, wherein the transmitter of at least one transmission system is connected to the receiver of the same transmission system, and the time-measuring device determines an internal signal transit time as the time between the emission of the control signal and the detection of the same control signal, and the internal signal transit time is stored in a storage element, and the calculating unit uses the stored internal signal transmit time when calculating the distance between the two transmission systems.

5. Security system according to claim 4, wherein the transmitter in at least one transmission system is capable of being connected to the receiver in the same transmission system only during a calibration procedure.

6. Security system according to claim 1, wherein at least one transmission system has a field strength measuring device that is connected to a field strength calculating unit for comparing the field strength of the received acknowledgment signals and the field strength of the noise, and wherein the field strength calculating unit controls a regulation means, which regulates the input amplification or transmitting power.

7. Security system according to claim 1, wherein the signal source includes a pulse shaper for generating Dirac pulse-imitating spike pulses, a lowpass filter, an amplitude modulator for superposing the filtered spike pulses on a carrier oscillation, and a dispersion filter having a frequency-dependent signal transit time.

8. Security system according to claim 1, wherein the signal source generates sawtooth-shaped pulses and controls a voltage-controlled oscillator for generating the output pulses.

9. Security system according to claim 1, wherein the signal source uses a digital signal processor for generation of the output pulses.

10. Security system according to claim 1, wherein the dispersion filter is a surface wave filter.

11. Security system according to claim 1, wherein the transmission systems have an electronic control means with at least one component which provides encoded signals, and wherein the encoded signals are changed after each transmitting and receiving cycle in accordance with a nested changing code.

12. Security system according to claim 11, wherein the component which provides encoded signals is constructed as a timed and programmable code manager.

13. Security system according to claim 11, wherein the encoded signals are encoded using a code $K_n$, comprising a part of the preceding code $K_{n-1}$ and a second element formed by a random generator.

14. Security system according to claim 1 wherein the transmission systems are constructed essentially identically.

15. Security system according to claim 1 wherein the operation cycle time and timing coordination for the transmission systems can be adjusted.

16. Security system according to claim 15, wherein the operation cycle time of the transmission systems is a time span of essentially 500 μs, which repeats itself cyclically.

17. Security system according to claim 15, wherein the operation cycle time is a time range of 500 ms to 2 seconds.

18. Security system according to claim 1 wherein several, like-constructed transmission systems are provided in order to expand the dimensions of the movement space for the object protected by the security system.

19. Security system according to claim 18, wherein the transmission systems are located in pairs at a relative distance from each other that corresponds, at a maximum, to twice the dimension of the receiving radius of the transmission systems.

20. Security system according to claim 1, wherein the transmission systems are constructed in the form of chip cards.

21. Security system according to claim 20, wherein the chip cards display a multi-layer construction.

22. Security system according to claim 1, wherein the wireless connection between the transmission systems is an electromagnetic coupling.

23. Security system according to claim 1, wherein the second transmission system is arranged in a fixed manner for monitoring a plurality of vehicles, and individual vehicles to be monitored are equipped with a first transmission system.

24. Security system according to claim 1, wherein the alarm signal is connected with a signal loudspeaker.

25. Security system according to claim 1, wherein the calculating unit is connected to a driver for driving an alarm device.

26. Security system according to claim 1, wherein the transmission systems are constructed in the form of a small size utility object.

27. Security system according to claim 1, wherein the wireless connection between the transmission systems is an acoustical coupling.

28. Security system according to claim 1, wherein the alarm signal drives a signal lamp.

29. Security system according to claim 1, wherein the measurement and alarm signal are transmitted through a wireless connection.

30. Security system according to claim 1, wherein the output pulses are formed by superposition of a pair of pulses which have a monotonically changing frequency.

* * * * *